US012578430B2

(12) United States Patent
Ghannam et al.

(10) Patent No.: US 12,578,430 B2
(45) Date of Patent: Mar. 17, 2026

(54) DYNAMIC SENSOR MODEL TO ADAPT VEHICLE MODIFICATIONS AND TRANSFORMATION

(71) Applicant: FORD GLOBAL TECHNOLOGIES, LLC, Dearborn, MI (US)

(72) Inventors: Mahmoud Y. Ghannam, Canton, MI (US); Jonathan Engels, Tecumseh, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 288 days.

(21) Appl. No.: 17/528,780

(22) Filed: Nov. 17, 2021

(65) Prior Publication Data

US 2023/0150525 A1     May 18, 2023

(51) Int. Cl.
*G01S 7/40* (2006.01)
*G01S 7/52* (2006.01)
*G06V 20/56* (2022.01)

(52) U.S. Cl.
CPC ........ *G01S 7/4039* (2021.05); *G01S 7/52004* (2013.01); *G06V 20/56* (2022.01)

(58) Field of Classification Search
CPC ................. B60W 50/12; B60W 40/09; B60W 2050/0088; B60W 2050/0062
See application file for complete search history.

(56) References Cited

U.S. PATENT DOCUMENTS

| | | | |
|---|---|---|---|
| 6,999,906 B2 | 2/2006 | Koehler et al. | |
| 9,493,117 B2 * | 11/2016 | Shehan | ................. G01S 13/931 |
| 10,207,757 B2 | 2/2019 | Scaringe | |
| 10,500,955 B2 * | 12/2019 | Mere | ......................... G06F 8/65 |
| 11,514,681 B2 * | 11/2022 | Kaku | ................ B60W 50/0205 |
| 11,721,205 B2 * | 8/2023 | Modica | ................ G08G 1/0141 |
| | | | 701/29.1 |
| 2016/0101730 A1 * | 4/2016 | Shehan | .................. B60Q 9/008 |
| | | | 340/431 |
| 2019/0197497 A1 | 6/2019 | Abari et al. | |
| 2020/0407930 A1 * | 12/2020 | Barker | ..................... E01H 5/06 |

(Continued)

FOREIGN PATENT DOCUMENTS

| | | | |
|---|---|---|---|
| DE | 102018220114 A1 * | 5/2020 | |
| DE | 102020215955 A1 * | 6/2022 | |
| KR | 20200084552 A * | 1/2019 | |

OTHER PUBLICATIONS

DE102020215955A1, Sasse et al. Espacenet MT.*

(Continued)

*Primary Examiner* — Navid Z. Mehdizadeh
*Assistant Examiner* — Oliver Tan
(74) *Attorney, Agent, or Firm* — Frank Lollo; Brooks Kushman P.C.

(57) ABSTRACT

A dynamic sensor model is implemented by a vehicle to adapt sensor behavior to vehicle modifications and transformations. Responsive to impairment of a feature of the vehicle due to initial conditions for a target sensor being outside a range of current readings and further to receiving signals indicative of a upfit to the vehicle, an upfit zone of the vehicle is identified. The upfit zone corresponds to the target sensor. One or more reconfigurations of sensors of the vehicle within the upfit zone are performed to address the impairment of the feature.

23 Claims, 5 Drawing Sheets

(56)     References Cited

U.S. PATENT DOCUMENTS

| | | | |
|---|---|---|---|
| 2021/0096215 A1* | 4/2021 | Slobodyanyuk | ........ H04W 4/38 |
| 2021/0287548 A1* | 9/2021 | Lai | .......................... B60R 1/025 |
| 2022/0366792 A1* | 11/2022 | Gass | ..................... G08G 1/168 |
| 2023/0071443 A1* | 3/2023 | Dimitrov | ................ G01S 17/87 |

OTHER PUBLICATIONS

DE102018220114A1 Maille et al Espacenet MT.*
2013 SAE Asil Decomposition.*
Data Fusion NPL 2006.*

\* cited by examiner

100

Upfit Zone
108A

Upfit Zone
108B

Sensor
106B

Vehicle
102

Sensor
106C

Sensing
Area B

Sensing
Area C

Sensing
Area A

Sensor
106A

Controller
104

200

Upfit Zone
108A

Upfit Zone
108B

Sensor
106B

Vehicle
102

Sensor
106C

Sensing
Area B

Sensing
Area C

Accessory
202

Sensing
Area A

Sensor
106A

Controller
104

300

Controller(s)
104

500

502

Identify Initial Conditions of Sensors from Sensor Catalog

504

Identify Upfit Options from Vehicle Upfit Catalog

506

Identify Sensor Locations with Respect to Upfit Locations

508

Identify Primary Initial Conditions of the Mapped Sensors in the Upfit Zones

*400*

700

708

Network Device

712

Input Device

704

Processor

710

Output Device

706

Storage

Computing Device
702

DYNAMIC SENSOR MODEL TO ADAPT VEHICLE MODIFICATIONS AND TRANSFORMATION

TECHNICAL FIELD

Aspects of the disclosure relate to a dynamic sensor model configured to adapt sensor behavior to vehicle modifications and transformations.

BACKGROUND

Trucks, vans, sport utility vehicles may be modified by fleet companies, upfit companies, or customers desiring aftermarket accessories. Plows, spreaders, hitches, mirrors, and light bars are some examples of accessories that may be added to vehicles after assembly.

SUMMARY

In one or more illustrative examples, a vehicle for implementing a dynamic sensor model to adapt sensor behavior to vehicle modifications and transformations is provided. A processor programmed to responsive to impairment of a feature of the vehicle due to initial conditions for a target sensor being outside a range of current readings and further to receiving signals indicative of a upfit to the vehicle, identify an upfit zone of the vehicle corresponding to the target sensor; and perform one or more reconfigurations of sensors of the vehicle within the upfit zone to address the impairment of the feature.

In one or more illustrative examples, a method for a dynamic sensor model is implemented by a vehicle to adapt sensor behavior to vehicle modifications and transformations. Responsive to impairment of a feature of the vehicle due to initial conditions for a target sensor being outside a range of current readings and further to receiving signals indicative of a upfit to the vehicle, an upfit zone of the vehicle is identified. The upfit zone corresponds to the target sensor. One or more reconfigurations of sensors of the vehicle within the upfit zone are performed to address the impairment of the feature.

In one or more illustrative examples, a non-transitory computer-readable medium includes instructions for implementing a dynamic sensor model by a vehicle to adapt sensor behavior to vehicle modifications and transformations that, when executed by one or more processors, cause the one or more processors to perform operations including responsive to impairment of a feature of the vehicle due to initial conditions for a target sensor being outside a range of current readings and further to receiving signals indicative of a upfit to the vehicle, identify an upfit zone of the vehicle corresponding to the target sensor; and perform one or more reconfigurations of sensors of the vehicle within the upfit zone to address the impairment of the feature.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Aftermarket assemblers may lack access to the design information original equipment manufacturers (OEMs) use. As a result, the assemblers may add components that block or inhibit sensor performance. To address these issues, a dynamic sensor model may be implemented that adapts the vehicle to operate optimally after vehicle modifications and transformations. A mapping of vehicle sensors to upfit zones may be performed. Initial conditions of sensors in the zones may be evaluated. Sensor attributes may be reconfigured and artificial intelligence (AI)/machine learning (ML) algorithms may be utilizing to fuse sensors data and compensate for any affected functionalities. Real-time alerts may be provided to aftermarket installers or users when changes affect vehicle sensors. Further aspects of the disclosure are discussed in detail herein.

Figure 1:
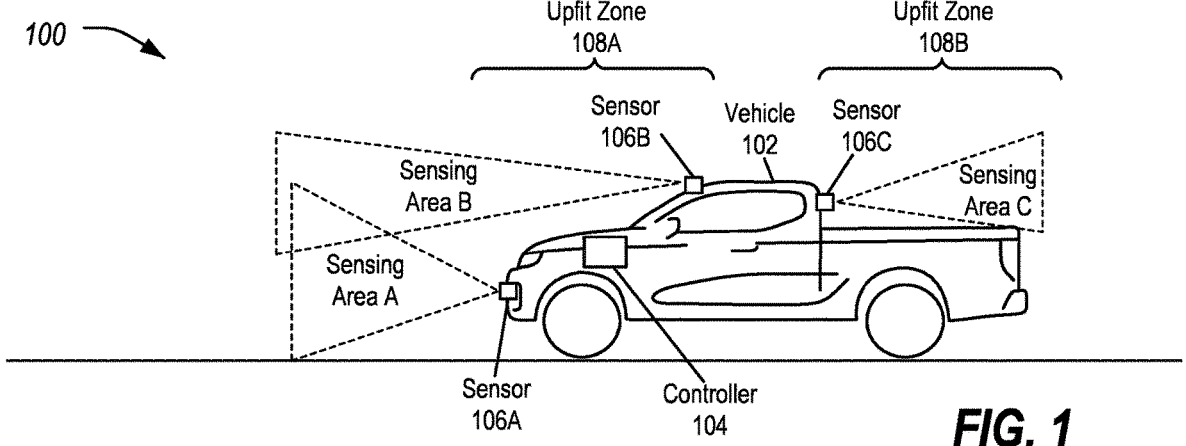
FIG. 1 illustrates an example system including a vehicle having a plurality of sensors within various upfit zones.

FIG. 1 illustrates an example system 100 including a vehicle 102 having a plurality of sensors 106 within various upfit zones 108. The vehicle 102 includes one or more controllers 104 configured to receive data from and otherwise control the sensors 106. As shown, a first upfit zone 108A includes sensors 106A and 106B, while a second upfit zones 108B includes sensor 106C. It should be noted that this is merely an example, and vehicles with more, fewer, and differently located controllers 104, sensors 106, and upfit zones 108 may be used.

The vehicle 102 may include various other types of passenger vehicles, such as sedans, crossover utility vehicles (CUVs), vans, sport utility vehicles (SUVs), trucks, recreational vehicles (RVs), scooters, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle, a parallel hybrid electric vehicle, or a parallel/series hybrid electric vehicle. As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

Although one is shown for simplicity, the vehicle 102 may include one or more of controllers 104 configured to perform and manage various vehicle 102 functions under the power of the vehicle battery and/or drivetrain. These vehicle controllers 104 may be discrete controllers 104 and/or may share physical hardware, firmware, and/or software, such that the functionality from multiple controllers 104 may be integrated into a single controller 104, and that the functionality of various such controllers 104 may be distributed across a plurality of controllers 104.

The controllers 104 of the vehicle 102 may make use of various sensors 106 to receive information with respect to the surroundings of the vehicle 102. These sensors 106 may include cameras or other imaging sensors configured to generate image data of their surroundings. For instance, image sensors may be placed to capture imaging of the interior of a vehicle and/or to capture imaging of the exterior of the vehicle. As some other examples, the sensors 106 may include radars, ultrasonic sensors, lidar sensors, or other types of sensors configured to generate data with respect to the surroundings of the vehicle 102.

The sensors 106 may be assigned to upfit zones 108 based on the location of the information provided by the sensors 106. As shown, the sensor 106A is a front-facing sensor 106 configured to provide information in sensing area A. The sensor 106B is also a front-facing sensor 106, but in this case configured to provide information in sensing area B, which is higher and set further back from sensing area A. These sensors include an overlapping region within the first upfit zone 108A. The sensor 106C is a rear-facing sensor 106 configured to provide information in sensing area C. Sensing area C is at a different non-overlapping location and is instead part of the second upfit zones 108B.

In some examples, the sensors 106 may have a static configuration. In such an example the sensor 106 may be at a fixed location and/or may provide data in a single format. However, in other examples the sensors 106 may be configurable. For instance, the sensors 106 may be controllable by the controllers 104 to adjust parameters such as sensing area, orientation, spectrum, data format, or other factors.

Figure 2:
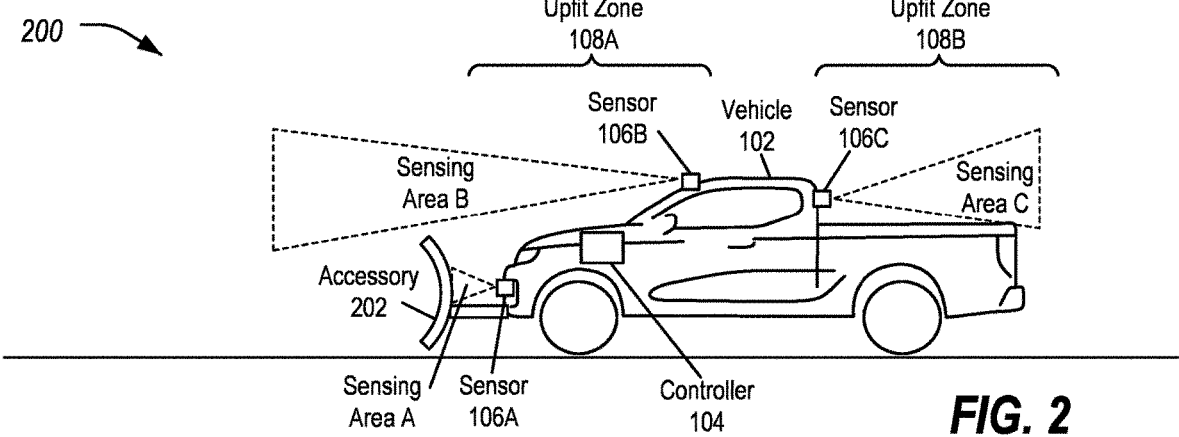
FIG. 2 illustrates an example of the vehicle of FIG. 1 with the addition of an aftermarket accessory to the first upfit zone.

FIG. 2 illustrates an example 200 of the vehicle 102 of FIG. 1 with the addition of an aftermarket accessory 202 to the first upfit zone 108A. As shown in the example 200, the accessory 202 is a plow attachment connected to the front of the vehicle 102 in the first upfit zone 108A. As such, the accessory 202 may affect the operation of the sensors 106 within the first upfit zone 108A. In particular, the sensors 106A is substantially blocked by the accessory 202. The sensor 106B, however, is relatively unaffected by the installation of the accessory 202 in the illustrated example 200.

Figure 3:
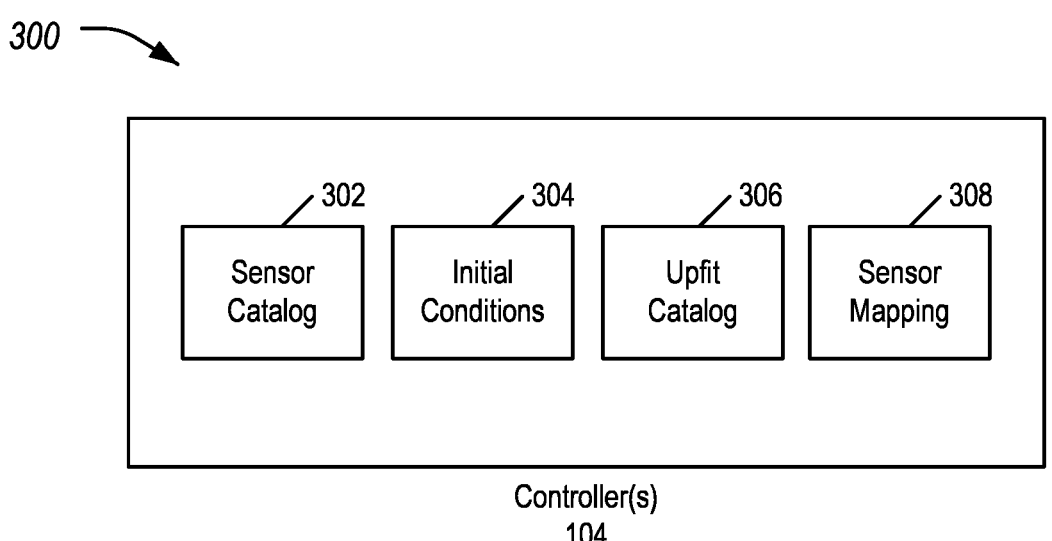
FIG. 3 illustrates an example of information maintained by the controllers to implement the dynamic sensor model to adapt the vehicle to operate after vehicle modifications and transformations.

FIG. 3 illustrates an example of information maintained by the controllers 104 to implement the dynamic sensor model to adapt the vehicle 102 to operate after vehicle modifications and transformations. As shown, the information may include a sensor catalog 302, initial conditions 304, upfit catalog 306, and a sensor mapping 308.

The sensor catalog 302 may indicate various attributes of the sensors 106 of the vehicle 102. These attributes may include the locations of the sensors 106 on the vehicle 102, the sensing area of the sensors 106 (e.g., field of view, sensing range, effective sensing area, etc.), and/or the configurable aspects of the sensors 106. The sensor catalog 302 may further include nominal values for the sensors 106, such as ideal sensing area, noise level, or other information with respect to unimpeded operation of the sensors 106. The sensor catalog 302 information may be installed to the vehicle 102 during build. The sensor catalog 302 may additionally or alternately be updated to the vehicle 102 via a local update by a servicer, an over-the-air update, or another software update procedure to the vehicle 102, e.g., based on the addition, removal, or refitting of the sensors 106 of the vehicle 102.

The initial conditions 304 may include aspects of the configuration and operation of the sensors 106 as installed to the vehicle 102. For instance, the initial conditions 304 may include aspects such as sensing area boundary points as the sensors 106 are installed to the vehicle 102, noise (e.g., dB) profile information, ambient temperature information, ambient barometric pressure information, etc.

The upfit catalog 306 may include definitions of the locations of the upfit zones 108 of the vehicle 102. The definitions of the upfit catalog 306 may be defined with respect to locations and/or functional areas of the vehicle 102. The upfit catalog 306 may be programmed to the vehicle 102 upon build (e.g., at end of line) and/or upon refit or other update to the vehicle 102.

The sensor mapping 308 may indicate a mapping of the sensors 106 to the upfit zones 108 of the vehicle 102. For instance, the sensor mapping 308 may include a mapping of the sensors 106 to the upfit zones 108 according to predefined factors such as location, sensing area, noise, and data usage.

Figure 4:
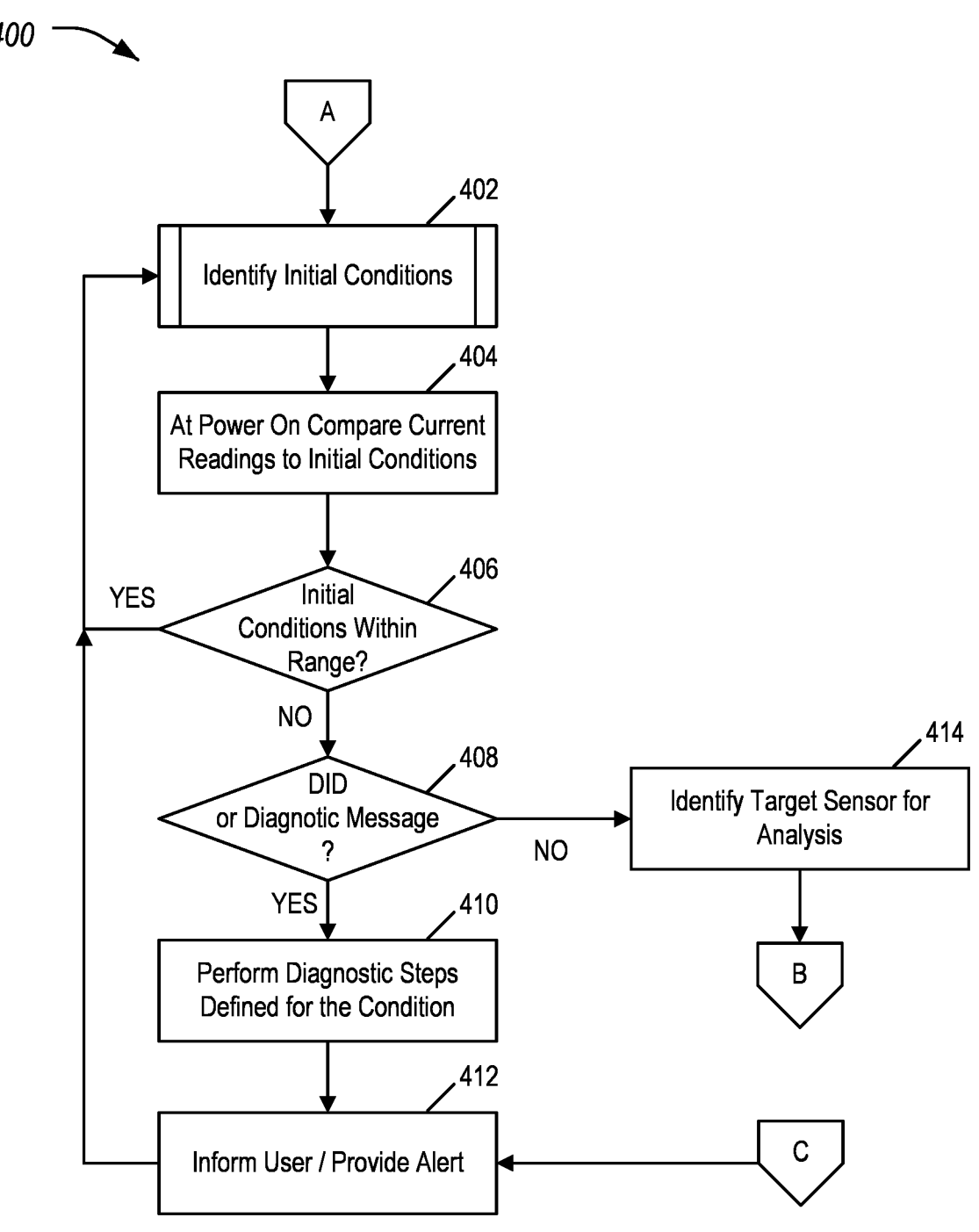
FIG. 4 illustrates an example process to implement the dynamic sensor model to adapt the vehicle to operate after vehicle modifications and transformations.

FIG. 4 illustrates an example process 400 to implement the dynamic sensor model to adapt the vehicle 102 to operate after vehicle modifications and transformations. While the process 400 is discussed as being performed by a controller 104, it should be noted that the process 400 may be performed by one or more controllers 104 of the vehicle 102 in the context of the system 100.

Figure 5:
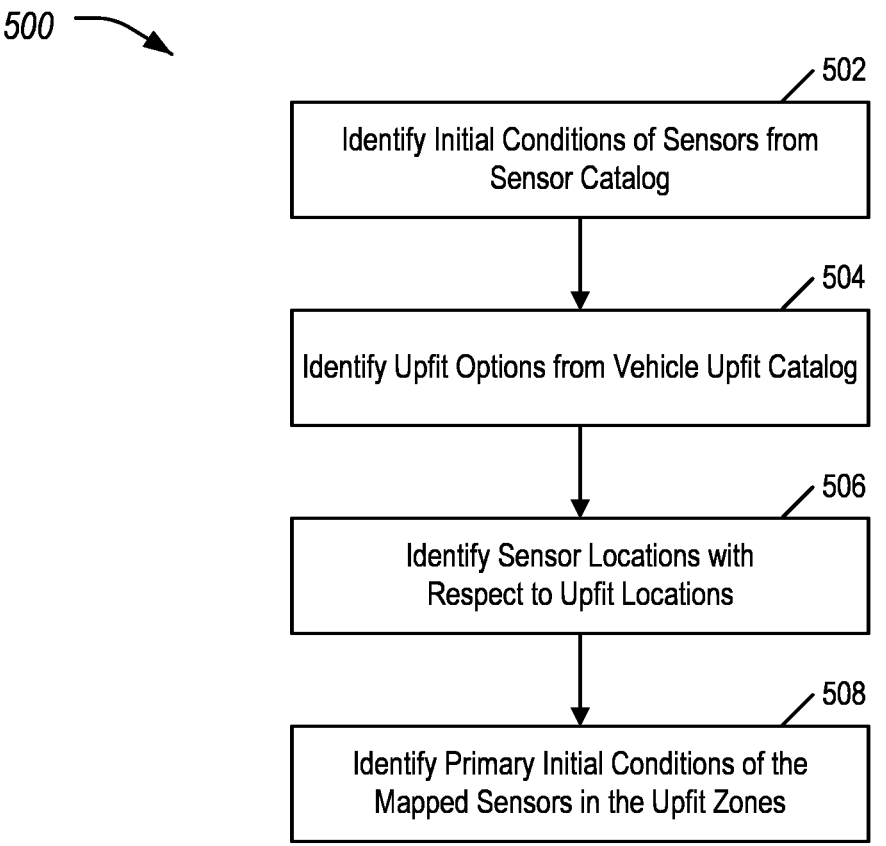
FIG. 5 illustrates an example subprocess of the process of FIG. 4 for the identification of the initial conditions.

At operation 402, the controller 104 identifies initial conditions 304. As noted above, the initial conditions 304 may include aspects of the configuration and operation of the sensors 106 as installed to the vehicle 102. FIG. 5 illustrates an example subprocess 500 for the identification of the initial conditions 304.

Referring more specifically to FIG. 5, and with continued reference to FIG. 4, at operation 502 the controller 104 identifies the initial conditions 304 of the sensors 106 from the sensor catalog 302. In an example, during a factory calibration or recalibration, the sensors 106 may store the locations of unique, static points on the vehicle 102 that are visible to the sensors 106 in their respective sensing areas. These static points may include, for example, unique body features of the vehicle 102 such as a curvature, stamping, or markings such as paint markings. The sensors 106 may also record other information, such as noise level, temperature, pressure, as some non-limiting possibilities.

At operation 504, the controller 104 identifies upfit options from the upfit catalog 306 of the vehicle 102. For instance, the controller 104 may access the upfit catalog 306 to identify the locations and/or other differentiating parameters of the upfit zones 108 of the vehicle 102. These upfit zones 108 may include, as some non-limiting examples, a front upfit zone 108, a roof upfit zone 108, a seat upfit zone 108, a door upfit zone 108, etc.

At operation 506, the controller 104 identifies locations of the sensors 106 with respect to the upfit locations defined by the upfit catalog 306. For instance, the controller 104 may utilize the location, sensing area, noise, and data usage information from the sensor catalog 302 to determine the sensor mapping 308 of the sensors 106 to the locations indicated in the upfit catalog 306. As one specific example, if one the upfit zones 108 is defined as including certain locations or sensing areas, then sensors 106 of the vehicle 102 that are located within those locations or that are configured (or configurable) to image at least a portion of that sensing area may be mapped to that upfit zone 108.

At operation 508, the controller 104 identifies primary initial conditions 304 of the mapped sensors 106 to the upfit zones 108. For instance, these primary initial conditions 304 may include aspects of the initial conditions 304 that are used for vehicle 102 features for which a user should be alerted if the feature is negatively affected. In one possibility, the controller 104 may include a mapping of sensors 106 to utilized features, which may be used to identify primary aspects. As an example, a lane keeping feature may be indicated as being a primary feature, while an undercarriage camera view feature may be indicated as being a secondary feature. After operation 508, control returns to operation 404 of the process 400.

Referring back to FIG. 4, at operation 404 the controller 104 compares current readings from the sensors 106 to the initial conditions 304. This comparison may be performed responsive to activation of the vehicle 102. For instance, the comparison may be done responsive to a user attempting to transition the vehicle 102 from a non-travel mode (in which the vehicle 102 remains at a static location) to a travel mode or motive mode (in which the vehicle 102 may move under its own power).

At operation 406, the controller 104 determines whether the initial conditions 304 are within range of nominal values for the initial conditions 304 as defined by the sensor catalog 302. For instance, the controllers 104 may determine whether the unique, static points on the vehicle 102 in the sensing areas of the respective sensors 106 are properly viewable. If so, then no issues with the sensors 106 are indicated and control returns to operation 402. If, however, the initial conditions 304 are not within range for one or more sensors 106, control passes to operation 408. For sake of explanation, these sensors for which the initial conditions 304 are not within range may be referred to herein as target sensors 106.

At operation 408, the controller 104 determines whether any diagnostic messages or codes were raised by the controllers 104 of the vehicle 102. For instance, a reason for the target sensors 106 not being within range may be the result of a situation that is captured in a diagnostic message. In an example, the codes may include data identifiers (DIDs), or parameter identifiers (PIDs) of the controllers 104 that may hold information that provides insight to system status and performance. An example DID/PID diagnostic mechanism is defined in Society of Automotive Engineer (SAE) standard J1979. If such a situation is indicated, then the issue with the target sensors 106 may likely be related to an diagnostic messages, as opposed to the installation of an accessory 202 to the vehicle 102. If such a message or code was raised, control passes to operation 410. If not, control passes to operation 414.

At operation 410, the controller 104 performs diagnostic steps for the target sensors 106 defined for the condition. This may include, for example, predefined measurements or other information predefined for collection based on occurrence of the diagnostic at operation 408.

At operation 412, the controller 104 informs a user and/or provides a user an indication of the condition. In an example, the controller 104 may cause the vehicle 102 to display a message to a human machine interface (HMI) of the vehicle 102 indicating the condition. The displaying may further include illustrating the predefined measurements and/or details of the diagnostic. In another example, the controller 104 may cause an alarm or other alerting mechanism of the vehicle 102 to sound to indicate the issue. In still a further possibility, the vehicle 102 may send a message to a mobile device of a user and or upfitter of the vehicle 102 to inform the user and/or upfitter of the issue. After operation 412, the process 400 may return to operation 402.

At operation 414, the controller 104 identifies one or more of the target sensors 106 for analysis. For instance, the controller 104 may create a list of which of one or more target sensors 106 are involved with primary features. Or, the controller 104 may elect to list all of the one or more target sensors 106 for further processing. After operation 414, the process 400 continues as shown in FIG. 6.

Figure 6:
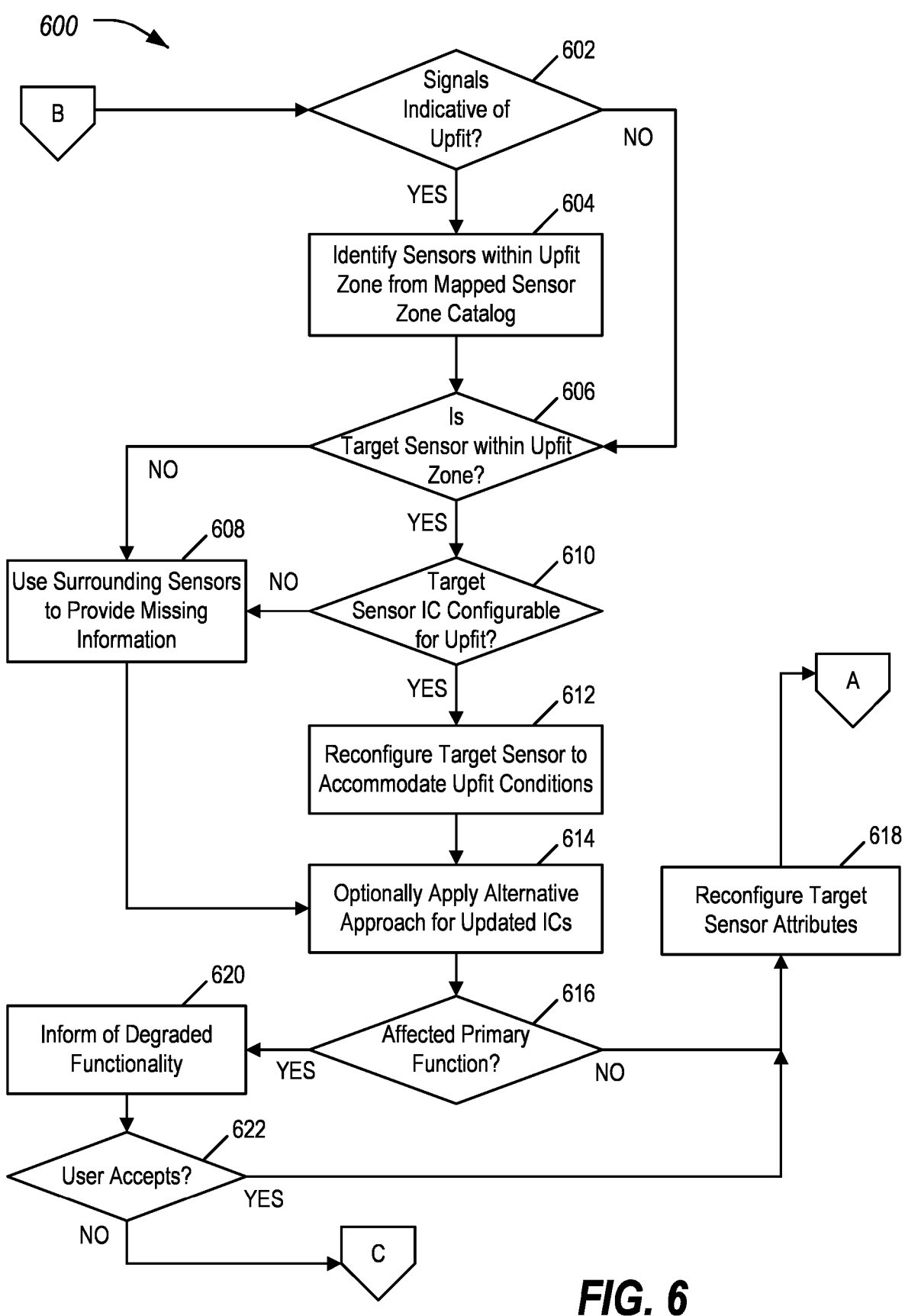
FIG. 6 illustrates an example process to implement further aspects of the dynamic sensor model to adapt the vehicle to operate after vehicle modifications and transformations.

FIG. 6 illustrates an example process 600 to implement further aspects of the dynamic sensor model to adapt the vehicle 102 to operate after vehicle modifications and transformations. While the process 600 is discussed as being performed by a controller 104, it should be noted that, as with the process 400 and the subprocess 500, the process 600 may be performed by one or more controllers 104 of the vehicle 102 in the context of the system 100.

At operation 602, the controller 104 determines whether signaling indicated that an upfit was performed to the vehicle 102. For instance, the controller 104 may receive signals from one or more vehicle 102 components indicating the installation, removal, and/or reconfiguration of one or more accessories 202 to the vehicle 102. This may include, for example, an indication that powered accessory 202 devices were wired into the vehicle 102. Or, this may include an indication that signals from the one or more accessories 202 are being sent to one or more controllers 104 of the vehicle 102. If the signaling indicated that an upfit was performed to the vehicle 102, control passes to operation 604. If not, control passes to operation 606.

At operation 604, the controller 104 identifies sensors within the upfit zone 108 of the target sensor 106. For instance, the controller 104 may access the sensor mapping 308 to identify other sensors 106 within the same upfit zone 108 as the signaling indicating the installation, removal, and/or reconfiguration.

At operation 606, the controller 104 determines whether the target sensor 106 is within the upfit zone 108. If the target sensor 106 is one of the sensors 106 indicated in the sensor mapping 308 as being within the upfit zone 108, control passes to operation 608. If not, control passes to operation 610.

At operation 608, the controller 104 utilizes surrounding sensors 106 to the target sensor 106 to provide information that is missing due to the situation with the target sensor 106. For example, if the sensing area of the target sensor 106 camera is partially or fully obstructed, then the controller 104 may receive information from the surrounding sensors 106 and may utilize that information to construct a simulated view as if the remaining information was available from the target sensor 106. As one possibility the simulated view may be generated based on a matrix projection of data from the surrounding sensors 106 taken from different viewpoints into a representation from the location of the obstructed target sensor 106.

In the alternative to using sensors within the upfit zone 108, at operation 610 proceeding from operation 606, the controller 104 determines whether the initial conditions 304 of the target sensor 106 are configurable for upfit. For example, the controller 104 may utilize the upfit catalog 306 to determine whether the target sensor 106 is capable of reconfiguration. If so, then the controller 104 may identify whether any configurable parameters of the target sensor 106 may be adjustable in a manner to mitigate the issues with the target sensor 106. For example, if the sensing area of the target sensor 106 is partially blocked, and the sensing area is adjustable, then the controller 104 may indicate to adjust the sensing area of the target sensor 106 to eliminate some of the blocked areas. If a configuration update may be performed to mitigate the issue, control passes to operation 612. If not, then control proceeds to operation 608 similar to as if the target sensor 106 is not located within a relevant upfit zone 108.

At operation 612 proceeding from operation 610, the controller 104 reconfigured the target sensor 106 to accommodate the upfit conditions. This may include adjustment of whatever parameters are determined to be adjustable to mitigate the issue, such as updates to sensing area, angle, zoom, sensor frequency, refresh interval, etc. After operation 612, control passes to operation 614.

At operation 614, proceeding either from operation 608 or from operation 614, the controller 104 optionally applies one or more alternative approaches to update the initial conditions 304. In an example, the controller 104 may apply AI/ML techniques on a fusion of data from the surrounding sensors 106 in lieu of affected information from the target sensor 106.

In another example, the simulated view may be based on historical data received over time from the surrounding sensors 106. For instance, if a sensor 106 historically receives a signal of an object after a similar signal is detected from one or more of the surrounding sensors 106, then the controller 104 may be able to infer the object detection signal as occurring after the similar signal is detected from one or more of the surrounding sensors 106.

In yet another example, the simulated view may utilize data from onboard smart devices or connected infrastructural sensors and vehicles, e.g., using data received via vehicle-to-everything (V2X) communication with other vehicles 102 or with infrastructure. Thus, the simulated view may use data received from a source external to the vehicle 102 to overcome deficiencies with the sensor data available from the sensors 106 of the vehicle 102.

At operation 616, the controller 104 determines whether the primary function still being affected despite the mitigations and/or simulations of the compromised data from the target sensor 106. For instance, if the primary feature identified at operation 508 is no longer due to the operations performed in the process 600, then control passes to operation 618.

At operation 618, the controller 104 completes the reconfiguration of the vehicle 102 to address the issue with the target sensor 106. After operation 618, control returns to operation 402 of the process 400.

If, however, the primary feature identified at operation 508 is still affected despite the operations performed in the process 600, control passes to operation 620 to inform a user and/or upfitter of the issue. For instance, if based on operation 508 the primary feature is still affected despite the operations performed in the process 600, then the controller 104 may cause the vehicle 102 to display a message to a HMI of the vehicle 102 indicating the condition. The displaying may further include illustrating the predefined measurements and/or details of the diagnostic. In another example, the controller 104 may cause an alarm or other alerting mechanism of the vehicle 102 to sound to indicate the issue. In still a further possibility, the vehicle 102 may send a message to a mobile device of a user and or upfitter of the vehicle 102 to inform the user and/or upfitter of the issue.

At operation 622, the controller 104 determines whether input is received to continue with the reconfigure of the vehicle 102, despite the issue persisting. This may allow a user or upfitter to continue with the upfit, which may be unavoidable based on some vehicle 102 modifications. If it is accepted to continue, control passes to operation 618. If not, control passes to operation 412 of the process 400 to provide an alert confirming the degraded functionality.

Thus, the dynamic sensor model may be implemented to adapt the vehicle 102 to operate after vehicle modifications and transformations. A mapping of vehicle sensors 106 to upfit zones 108 may be performed. Initial conditions 304 of sensors 106 in the upfit zones 108 may be evaluated. Sensor attributes may be reconfigured and algorithms may be utilizing to fuse sensor 106 data and compensate for any affected functionalities. Real-time alerts may be provided to aftermarket installers when they affect functionality of the vehicle 102.

Figure 7:
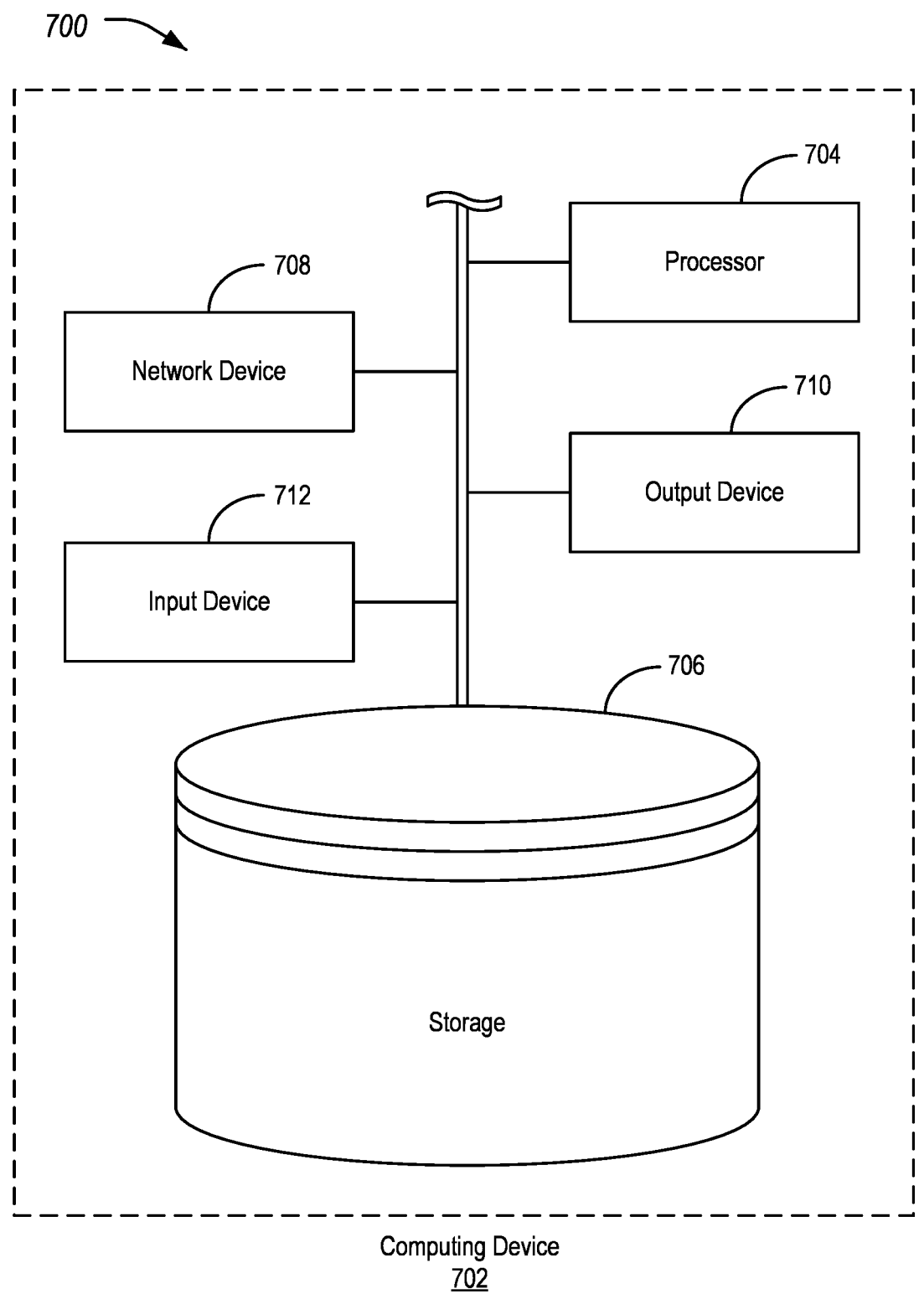
FIG. 7 illustrates an example of a computing device for use by the camera compensation service.

FIG. 7 illustrates an example 700 of a computing device 702 for use implementing the sensor fusion to build active areas of interest for faster processing of deep learning models. Referring to FIG. 7, and with reference to FIGS. 1-6, the controller 104 may be an example of such a computing device 702. As shown, the computing device 702 may include a processor 704 that is operatively connected to a storage 706, a network device 708, an output device 710, and an input device 712. It should be noted that this is merely an example, and computing devices 702 with more, fewer, or different components may be used.

The processor 704 may include one or more integrated circuits that implement the functionality of a central processing unit (CPU) and/or graphics processing unit (GPU). In some examples, the processors 704 are a system on a chip (SoC) that integrates the functionality of the CPU and GPU. The SoC may optionally include other components such as, for example, the storage 706 and the network device 708 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 704 executes stored program instructions that are retrieved from the storage 706. The stored program instructions, accordingly, include software that controls the operation of the processors 704 to perform the operations described herein. The storage 706 may include both non-volatile memory and volatile memory devices. The non-volatile memory includes solid-state memories, such as negative-AND (NAND) flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100. For instance the storage 706 may be configured to maintain one or more of the sensor catalog 302, initial conditions 304, upfit catalog 306, and sensor mapping 308.

The GPU may include hardware and software for display of at least 2D and optionally 3D graphics to the output device 710. The output device 710 may include a graphical or visual display device, such as an electronic display screen, projector, printer, or any other suitable device that reproduces a graphical display. As another example, the output device 710 may include an audio device, such as a loudspeaker or headphone. As yet a further example, the output device 710 may include a tactile device, such as a mechanically raiseable device that may, in an example, be configured to display braille or another physical output that may be touched to provide information to a user.

The input device 712 may include any of various devices that enable the computing device 702 to receive control input from users. Examples of suitable input devices that receive human interface inputs may include keyboards, mice, trackballs, touchscreens, voice input devices, graphics tablets, and the like.

The network devices 708 may each include any of various devices that enable computing device 702 to send and/or receive data from external devices over networks. Examples of suitable network devices 708 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle for implementing a dynamic sensor model to adapt sensor behavior to vehicle modifications and transformations, comprising:
a processor programmed to:
responsive to impairment of a feature of the vehicle due to initial conditions for a target sensor of the vehicle being outside a range of current readings of the target sensor and further to receiving signals indicative of a upfit to the vehicle from one or more vehicle components indicating the installation, removal, and/or reconfiguration of one more accessories to the vehicle,
identify an upfit zone of a plurality of upfit zones of the vehicle corresponding to the target sensor, each of the plurality of upfit zones corresponding to a different location of the vehicle, and
perform one or more reconfigurations of sensors of the vehicle within the upfit zone to address the impairment of the feature responsive to the upfit in the upfit zone, including to access a sensor mapping to identify other surrounding sensors within the upfit zone; and use the surrounding sensors to provide missing information to address the impairment of the feature.

2. The vehicle of claim 1, wherein the processor is further programmed to, responsive to the impairment of the feature of the vehicle continuing despite the one or more reconfigurations, inform a user of degraded functionality of the feature.

3. The vehicle of claim 1, wherein the processor is further programmed to:
access a sensor catalog to identify configurable aspects of the target sensor; and
adjust the configurable aspects to provide missing information to address the impairment of the feature.

4. The vehicle of claim 3, wherein the configurable aspects include one or more of a sensing area of the target sensor, an orientation of the target sensor, a measured spectrum of the target sensor, or a data format of the target sensor.

5. The vehicle of claim 1, wherein the signals indicative of the upfit to the vehicle include signals indicative of connection of an accessory to an upfit controller of the vehicle.

6. The vehicle of claim 1, wherein the initial conditions include locations of unique, static points on the vehicle that are visible to the sensors in their respective sensing areas.

7. The vehicle of claim 6, wherein the static points include body features of the vehicle.

8. The vehicle of claim 1, wherein the plurality of upfit zones include one or more of a front upfit zone, a roof upfit zone, a seat upfit zone, and/or a door upfit zone.

9. The vehicle of claim 1, wherein the processor is further programmed to apply artificial intelligence (AI)/machine learning (ML) techniques on a fusion of data from the surrounding sensors in lieu of affected information from the target sensor.

10. A method for implementing a dynamic sensor model by a vehicle to adapt sensor behavior to vehicle modifications and transformations, comprising:

responsive to impairment of a feature of the vehicle due to initial conditions for a target sensor of the vehicle being outside a range of current readings of the target sensor and further to receiving signals indicative of a upfit to the vehicle from one or more vehicle components indicating the installation, removal, and/or reconfiguration of one more accessories to the vehicle, identifying an upfit zone of a plurality of upfit zones of the vehicle corresponding to the target sensor, each of the plurality of upfit zones corresponding to a different location of the vehicle; and performing one or more reconfigurations of sensors of the vehicle within the upfit zone to address the impairment of the feature responsive to the upfit in the upfit zone, including accessing a sensor mapping to identify other surrounding sensors within the upfit zone; and using the surrounding sensors to provide missing information to address the impairment of the feature.

11. The method of claim 10, further comprising, responsive to the impairment of the feature of the vehicle continuing despite the one or more reconfigurations, informing a user of degraded functionality of the feature.

12. The method of claim 10, further comprising:

accessing a sensor catalog to identify configurable aspects of the target sensor; and adjusting the configurable aspects to provide missing information to address the impairment of the feature.

13. The method of claim 12, wherein the configurable aspects include one or more of a sensing area of the target sensor, an orientation of the target sensor, a measured spectrum of the target sensor, or a data format of the target sensor.

14. The method of claim 10, wherein the signals indicative of the upfit to the vehicle include signals indicative of connection of an accessory to an upfit controller of the vehicle.

15. The method of claim 10, wherein the initial conditions include locations of unique, static points on the vehicle that are visible to the sensors in their respective sensing areas.

16. The method of claim 15, wherein the static points include body features of the vehicle.

17. A non-transitory computer readable medium comprising instructions for implementing a dynamic sensor model by a vehicle to adapt sensor behavior to vehicle modifications and transformations that, when executed by one or more processors, cause the one or more processors to perform operations including:

responsive to impairment of a feature of the vehicle due to initial conditions for a target sensor of the vehicle being outside a range of current readings of the target sensor and further to receiving signals indicative of a upfit to the vehicle from one or more vehicle components indicating the installation, removal, and/or reconfiguration of one more accessories to the vehicle, identify an upfit zone of a plurality of upfit zones of the vehicle corresponding to the target sensor, each of the plurality of upfit zones corresponding to a different location of the vehicle; and perform one or more reconfigurations of sensors of the vehicle within the upfit zone to address the impairment of the feature responsive to the upfit in the upfit zone, including to access a sensor mapping to identify other surrounding sensors within the upfit zone; and use the surrounding sensors to provide missing information to address the impairment of the feature.

18. The medium of claim 17, further comprising instructions that, when executed by the one or more processors, cause the one or more processors to perform operations including to, responsive to the impairment of the feature of the vehicle continuing despite the one or more reconfigurations, inform a user of degraded functionality of the feature.

19. The medium of claim 17, further comprising instructions that, when executed by the one or more processors, cause the one or more processors to perform operations including to:

access a sensor catalog to identify configurable aspects of the target sensor; and adjust the configurable aspects to provide missing information to address the impairment of the feature.

20. The medium of claim 19, wherein the configurable aspects include one or more of a sensing area of the target sensor, an orientation of the target sensor, a measured spectrum of the target sensor, or a data format of the target sensor.

21. The medium of claim 17, wherein the signals indicative of the upfit to the vehicle include signals indicative of connection of an accessory to an upfit controller of the vehicle.

22. The medium of claim 17, wherein the initial conditions include locations of unique, static points on the vehicle that are visible to the sensors in their respective sensing areas.

23. The medium of claim 22, wherein the static points include body features of the vehicle.

* * * * *